United States Patent [19]

Chang

[11] Patent Number: 4,896,762
[45] Date of Patent: Jan. 30, 1990

[54] VIBRATING SEPARATOR FOR AGGREGATED ENTANGLED PIECES

[76] Inventor: Yu-Ting Chang, No. 53, Lane 46, Chung Shan E. Road, Fong-Shan City, Kaohsiung Hsien, Taiwan

[21] Appl. No.: 257,284

[22] Filed: Oct. 13, 1988

[51] Int. Cl.[4] .............................................. B65G 27/10
[52] U.S. Cl. ................................... 198/761; 198/759; 198/766; 198/771
[58] Field of Search ............... 198/758, 759, 761, 763, 198/766, 769, 771

[56] References Cited

U.S. PATENT DOCUMENTS

| | | | |
|---|---|---|---|
| 3,269,534 | 8/1966 | Clark et al. | 198/759 X |
| 3,342,075 | 9/1967 | Lowe | 198/763 X |
| 3,346,097 | 10/1967 | Carrier, Jr. | 198/761 |
| 3,958,687 | 5/1976 | Adams et al. | 198/758 |
| 4,088,223 | 5/1978 | Bertrand | 198/761 |

FOREIGN PATENT DOCUMENTS

| | | | |
|---|---|---|---|
| 0663641 | 5/1979 | U.S.S.R. | 198/759 |
| 1276588 | 12/1986 | U.S.S.R. | 198/759 |

Primary Examiner—Robert J. Spar
Assistant Examiner—Lyle Kimms
Attorney, Agent, or Firm—Lerner, David, Littenberg, Krumholz & Mentlik

[57] ABSTRACT

A vibrating separator comprises a tray which is mounted on a platform by front helical spring members and an elastic cantileverlike member has a front end fixed to the bottom of the tray and a rear end fixed to a rear rigid support mounted on the platform. An electric vibrator is mounted on the platform and connected to the bottom side of the front portion of the tray. Upon vibrating the tray, small entangled pieces are moved at a faster speed at the front part of the tray than at the rear part thereof, thereby separating the pieces and fowarding them to the front delivery end of the tray.

2 Claims, 2 Drawing Sheets

VIBRATING SEPARATOR FOR AGGREGATED ENTANGLED PIECES

BACKGROUND OF THE INVENTION

This invention relates to a vibrating separator and particularly to a vibrating separator for separating small, aggregated entangled pieces.

Conventionally, small, aggregated entangled pieces such as electronic elements are forwarded by hand to a vibrating disc or the next processing station. For instance, in dispensing electronic elements such as resistors, capacitors, etc., which usually become entangled with each other when they are held together, these elements are put on a tray A, as shown in FIG. 1, and then transferred by hand at appropriate time intervals to a vibrator B which has a substantially helical path to let the elements slide down one after another to a delivery opening. To save labor and time, it is desirable to make an improvement in such an apparatus for delivering electronic elements.

SUMMARY OF THE INVENTION

An object of the present invention is to provide an apparatus for automatically separating and delivering small aggregated entangled pieces.

According to the present invention, a vibrating separator for small aggregated entangled pieces which comprises a platform having a front portion and a rear portion, a tray for holding small aggregated pieces having a front portion with a delivery outlet and a rear portion, a rigid support mounted on the rear portion of the platform below the rear portion of the tray, an elastic cantileverlike member having one end fixed to the rigid support and another end connected to a bottom side of the rear portion of the tray, an elastic support member mounted on the front portion of the platform and connected to the bottom side of the front portion of the tray, and a vibrator mounted on the front portion of the platform and connected to the bottom side of the front portion of the tray, whereby the tray can be vibrated to move small entangled pieces at a faster speed at the front portion thereof than at the rear portion thereof, thereby separating and forwarding the small pieces to the delivery outlet.

The present exemplary preferred embodiment will be described in detail with reference to the accompanying drawings, in which:

DETAILED DESCRIPTION OF THE PREFERRED EMBODIMENT

Figure 1:
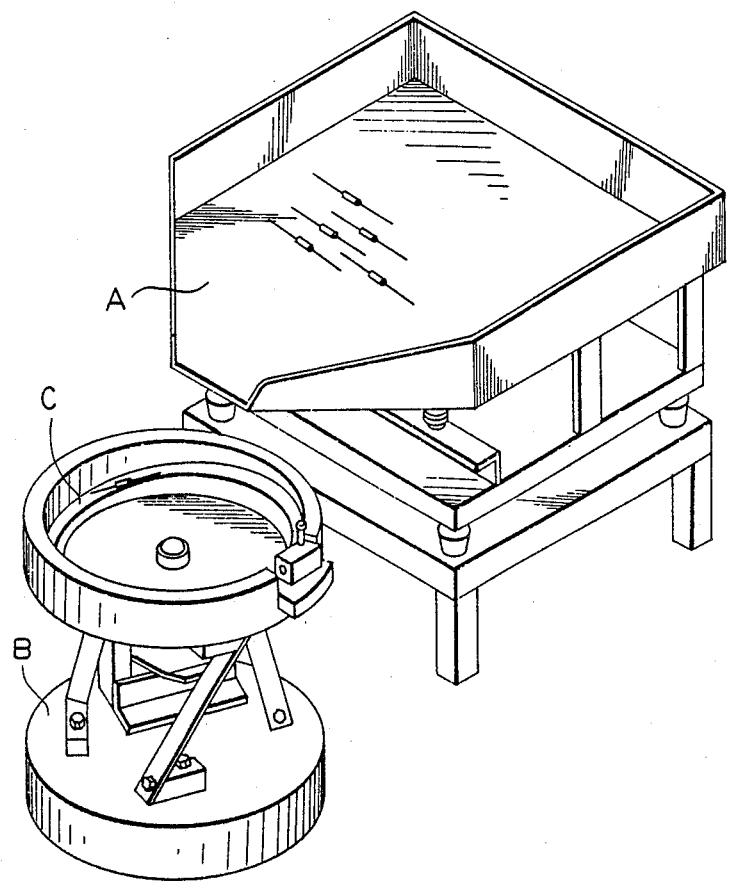
FIG. 1 shows a conventional vibrating separator.
Figure 2:
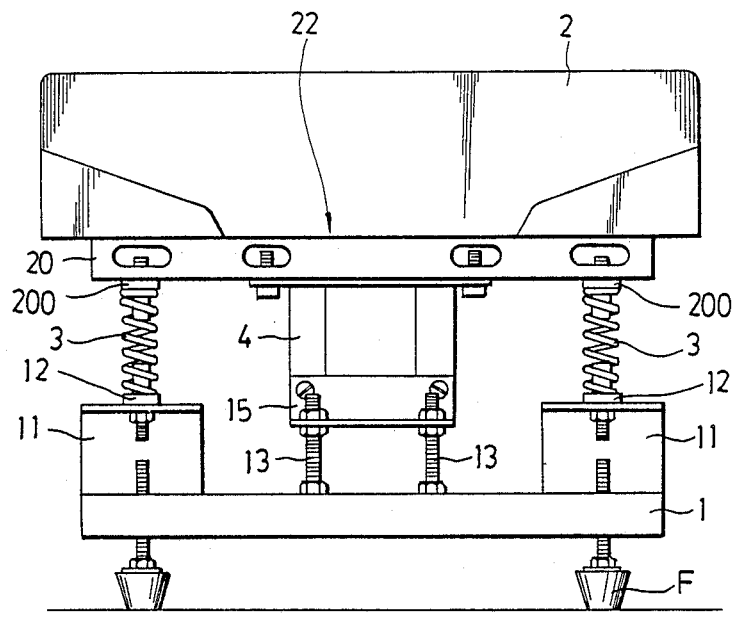
FIG. 2 shows a front elevation view of a vibrating separator according to the present invention.
Figure 3:
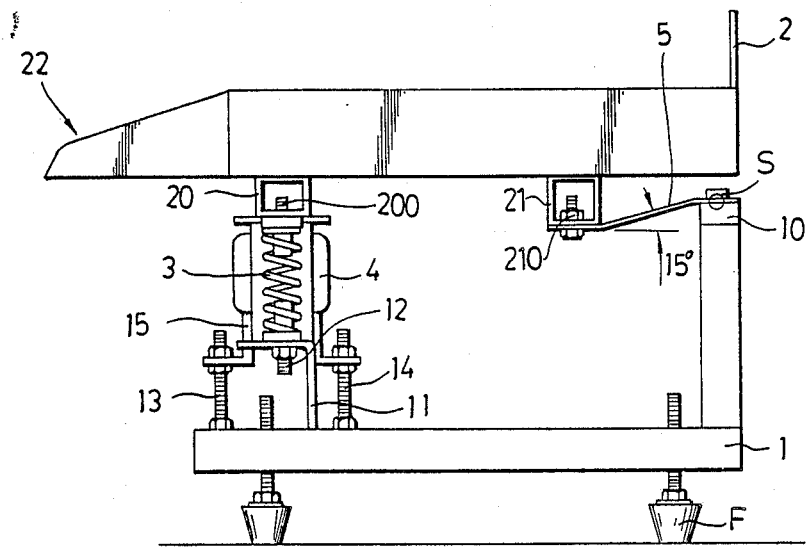
FIG. 3 shows a side elevation view of a vibrating separator of FIG. 2.

Referring to FIGS. 2 and 3, an embodiment of a vibrating separator of the present invention is shown, having a platform 1, a tray 2 for holding the articles to be separated, an upstanding support 10 mounted on the rear part of the platform 1, a cantilever-like elastic member 5 mounted on the top of the support 10 to hold the rear part of the tray 2, and an electric vibrating unit 4 provided between the front portions of The platform 1 is supported by four adjustable legs F and two angled bracket plates 11 which are mounted on the front part of the platform 1. To the bottom side of the tray 2 is attached a front and a rear elongated channel piece 20 and 21. The cantilever member 5 which has one end thereof mounted on, the support 10 is connected to the rear channel piece 21 with a locking member 210. The cantilever member 5 is placed in an inclined position, preferably having a slope of about 15 degrees.

Two helical spring members 3 are provided between the front channel piece 20 and the angled bracket plates 11 and positioned thereto by means of upper positioning members 200 and lower positioning members 12. The vibrating unit 4 is an electric vibrator, and is provided between the spring members 3 and mounted on the platform 1 by means of mounting members 13, 14 which hold a support 15. The support 15 carries the vibrating unit 4 and is connected to the front channel pieces 20.

When the vibrating unit 4 is energized, the tray 2 is vibrated. The degree of vibration of the tray 2 is lesser at the portion thereof near the fixed point of the cantilever-like member 5 and is greater at the portion away from the fixed point so that the aggregate pieces are separated and moved with different speeds to the outlet of the tray.

With the invention thus explained, it is apparent that numerous modifications and variations can be made without departing from the scope of the invention. It is therefore intended that the invention be limited only as indicated in the appended claims.

What is claimed is:

1. A vibrating separator for small aggregated and entangled pieces comprising:
   (a) a platform having a front portion and a rear portion;
   (b) a substantially horizontal tray for holding small aggregated pieces having a front portion with a delivery outlet and a rear portion;
   (c) a rigid support mounted on said rear portion of said platform below said rear portion of said tray;
   (d) a flexible cantilever member having one end rigidly fixed to said rigid support and another end rigidly fixed to a bottom side of said rear portion of said tray at a location displaced towards said front portion of said tray, whereby said flexible cantilever generally runs in a direction parallel to said tray;
   (e) a flexible support member mounted on said front portion of said platform and connected to the bottom side of said front portion of said tray; and
   (f) a vibrator mounted on said front portion of said platform and connected to said bottom side of said front portion of said tray;
   whereby said tray can be vibrated to move small entangled pieces at a faster speed at said front portion thereof than at said rear portion thereof, thereby separating and forwarding the small pieces to said delivery outlet.

2. A vibrating separator as claimed in claim 1, wherein said flexible cantilever is inclined from its point of attachment to the tray to its point of attachment to the rigid support at a slope of about 15 degrees from the horizontal.

* * * * *

UNITED STATES PATENT AND TRADEMARK OFFICE
CERTIFICATE OF CORRECTION

PATENT NO. : 4,896,762

DATED : January 30, 1990

INVENTOR(S) : Yu-Ting Chang

It is certified that error appears in the above-identified patent and that said Letters Patent is hereby corrected as shown below:

In the Abstract, line 3, after "member" insert --which--.

Column 2, line 2, after "portions of" insert --the platform and the tray.--.

Signed and Sealed this

Second Day of July, 1991

Attest:

HARRY F. MANBECK, JR.

Attesting Officer

Commissioner of Patents and Trademarks